(12) United States Patent
Amamori

(10) Patent No.: US 6,832,780 B2
(45) Date of Patent: Dec. 21, 2004

(54) PASSENGER-SEAT AIRBAG DEVICE

(75) Inventor: Ichiro Amamori, Hikone (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/252,423

(22) Filed: Sep. 24, 2002

(65) Prior Publication Data

US 2003/0034639 A1 Feb. 20, 2003

Related U.S. Application Data

(63) Continuation-in-part of application No. 09/892,439, filed on Jun. 28, 2001, now abandoned.

(30) Foreign Application Priority Data

Jul. 7, 2000 (JP) ......................................... 2000-207013

(51) Int. Cl.[7] .............................................. B60R 21/16
(52) U.S. Cl. .................................... 280/743.2; 280/729
(58) Field of Search .......................... 280/743.1, 743.2, 280/729, 732, 739

(56) References Cited

U.S. PATENT DOCUMENTS 3,476,402 A * 11/1969 Wilfert ....................... 280/729
3,642,303 A * 2/1972 Irish et al. ................ 280/730.1
3,879,056 A * 4/1975 Kawashima et al. ...... 280/743.2
4,290,627 A * 9/1981 Cumming et al. .......... 280/729
5,310,214 A * 5/1994 Cuevas ........................ 280/729
5,945,184 A * 8/1999 Nagata et al. ............. 428/35.2
6,502,858 B2 * 1/2003 Amamori ................. 280/743.2

* cited by examiner

Primary Examiner—David R. Dunn
(74) Attorney, Agent, or Firm—Manabu Kanesaka

(57) ABSTRACT

A passenger-seat airbag device for a vehicle includes an instrument panel for the vehicle, a windshield extending upwardly from the instrument panel, and an airbag installed in an upper surface of the instrument panel to be inflated between the windshield and an occupant. The airbag includes a first surface facing the windshield, a second surface facing the occupant, and an internal member connecting the first and second surfaces. When the airbag is fully inflated, a top of the first surface contacts the windshield, a rest of the first surface is separated from the windshield, and a part of the first surface under the top is pulled toward the second surface by the internal member so that the airbag has a concave depression extending toward the second surface.

5 Claims, 3 Drawing Sheets

PASSENGER-SEAT AIRBAG DEVICE

CROSS REFERENCE TO RELATED APPLICATION

This is a continuation in part application of Ser. No. 09/892,439 filed on Jun. 28, 2001, abandoned.

BACKGROUND OF THE INVENTION AND RELATED ART STATEMENT

The present invention relates to a passenger-seat airbag device which is disposed in an automobile instrument panel to protect an occupant by inflating between a windshield and the occupant in a passenger seat upon an emergency such as a vehicle collision, and more specifically relates to a passenger-seat airbag device having means for restricting a final expanded shape of the airbag formed when the airbag is inflated.

In general, a passenger-seat airbag of an automobile is accommodated within a container-like retainer so as to be disposed in an instrument panel and covered with a lid (lid-like member) attached to the retainer. The retainer is provided with an inflator for generating gas to inflate the airbag.

Upon an emergency such as a vehicle collision, the passenger-seat airbag is inflated by gas from the inflator operated for injecting the gas and largely expands into a vehicle cabin by pushing and opening the lid to receive an occupant rapidly moving forwardly due to an impact of the collision, etc.

FIG. 2 is a sectional view of a conventional passenger-seat airbag 100 showing an expanded state thereof.

The passenger-seat airbag 100 has a substantially conical expanded shape tapered toward the rear end (left end viewed in FIG. 2, which is identical below) thereof. The front end (right end viewed in FIG. 2, which is identical below) of the airbag 100 opposes an occupant when the airbag 100 is inflated upon an emergency such as a vehicle collision so as to form an occupant-facing surface 102 having an area sufficient for receiving the occupant. The upper-side (upper side viewed in FIG. 2, which is identical below) face of the airbag 100 forms a windshield-facing surface 104 opposing a windshield 122 in the front of the vehicle when the airbag 100 is inflated.

The periphery of an opening 106 at the rear end of the airbag 100 is connected to the opening periphery in the front side of a container-like retainer 110. Within the retainer 110, an inflator 112 is equipped so that gas injected from the inflator 112 is introduced into the airbag 100 via these openings. The airbag 100 is folded and accommodated into the retainer 110. A lid 114 is attached to the opening of the retainer 110 and the airbag 100 is equipped in an automobile instrument panel 120.

Upon an emergency such as a vehicle collision, the airbag 100 is inflated by gas from the inflator 112 operated for injecting the gas and expands into a vehicle cabin by pushing and opening the lid 114.

The airbag 100 expanded into the vehicle cabin is largely inflated between a windshield 122 of a vehicle body and an occupant. At this time, while the occupant-facing surface 102 is inflated so as to oppose and ready to receive the occupant, the windshield-facing surface 104 is inflated along the windshield 122 so as to oppose the windshield 122. When the occupant impacts the occupant-facing surface 102 so as to urge the airbag 100, the windshield-facing surface 104 is securely held by abutting to the windshield 122 so as to securely receive the occupant.

Since such a passenger-seat airbag requires to be inflated over a wide range so as to securely receive an occupant by filling up a space among the occupant, the vehicle-body windshield, and the instrument panel, the airbag is liable to have a large capacity, so that various means have been taken in order to complete the rapid expansion of such a large-capacity airbag after the beginning of the inflating.

One of such means is to increase the output of the inflator which is a gas generator for inflating the airbag; however, because the large-capacity inflator is expensive and applying a large stress to the airbag and adapters as well, these other members also require high-strength designs, so that the large-capacity inflator is not preferable in cost and weight.

There is therefore an airbag, for example, constructed to promptly complete the expansion after the initiation of the inflation of the airbag even when using a relatively small capacity inflator by reducing the volume of the airbag by connecting between an occupant-facing surface of the airbag and the periphery of an opening for gas-introduction fixed to a retainer at the rear end of the airbag with a strap, etc., so as to restrict the inflation of the occupant-facing surface.

However, when the volume of the airbag is reduced by restricting the inflation of the occupant-facing surface so as to control the expansion of the airbag in such a manner, the distance between the occupant and the occupant-facing surface in a final expanded shape of the airbag would be increased.

It is an object of the present invention to provide a passenger-seat airbag device having a sufficient capacity for absorbing an impact when the airbag is expanded and also being capable of completing the expansion promptly without increasing the output of an inflator by solving such the problems.

SUMMARY OF THE INVENTION

A passenger-seat airbag device according to the present invention is disposed in an instrument panel, and includes an airbag, which inflates between a windshield and an occupant. In the airbag device, a concave depression which separates the airbag from the windshield is formed on a windshield-facing surface of the airbag when the airbag forms a final expanded shape.

Preferably, a passenger-seat airbag further includes an internal member connecting the windshield-facing surface to an occupant-facing surface of the airbag, wherein the internal member connects the windshield-facing surface to the occupant-facing surface such that the windshield-facing surface is separated from the windshield when the final expanded shape is formed.

According to the passenger-seat airbag device of the present invention, when an inflator for inflating the airbag is operated to inflate the airbag upon an emergency such as a vehicle collision, the occupant-facing surface of the airbag is inflated toward an occupant due to the gas pressure from the inflator while an intermediate portion of the windshield-facing surface of the airbag, which is connected to the occupant-facing surface via the internal member, is pulled by the occupant-facing surface toward the occupant, for example. Thus, the windshield-facing surface is separated from the windshield so as to sink into the airbag.

Consequently, the volume of the airbag is reduced by the amount spaced from the windshield (inwardly depressed amount) of the upper intermediate portion of the windshield-facing surface, so that the airbag of the present invention can rapidly complete the inflation even when the output of the inflator is relatively small. Also, the windshield-facing surface, which does not oppose the occupant, is depressed inside the airbag so as to reduce the volume of the airbag, and the occupant-facing surface approaches sufficiently close to the occupant upon completion of the expansion. Accordingly, the occupant is promptly received by the occupant-facing surface in the vehicle collision, so that the occupant can be protected.

In the airbag, upon completion of the expansion, the intermediate portion of the windshield-facing surface becomes a concavely depressed state inside the airbag so as to be spaced from the windshield, and the upper part of the airbag is inflated so as to oppose any of the windshield and the occupant. Therefore, even when the occupant impacts and strongly urges the airbag, the upper end of the windshield-facing surface abuts against the windshield so as to securely support the airbag, enabling to securely absorb the impact from the occupant.

In the passenger-seat airbag device according to the present invention, the internal member may not break even in a finally expanded shape to connect the windshield-facing surface and the occupant-facing surface. However, it may be designed to break or tear when the occupant impacts the inflated airbag, to thereby absorb the impact due to the breaking or tearing of the internal member.

DETAILED DESCRIPTION OF PREFERRED EMBODIMENTS

Figure 1:
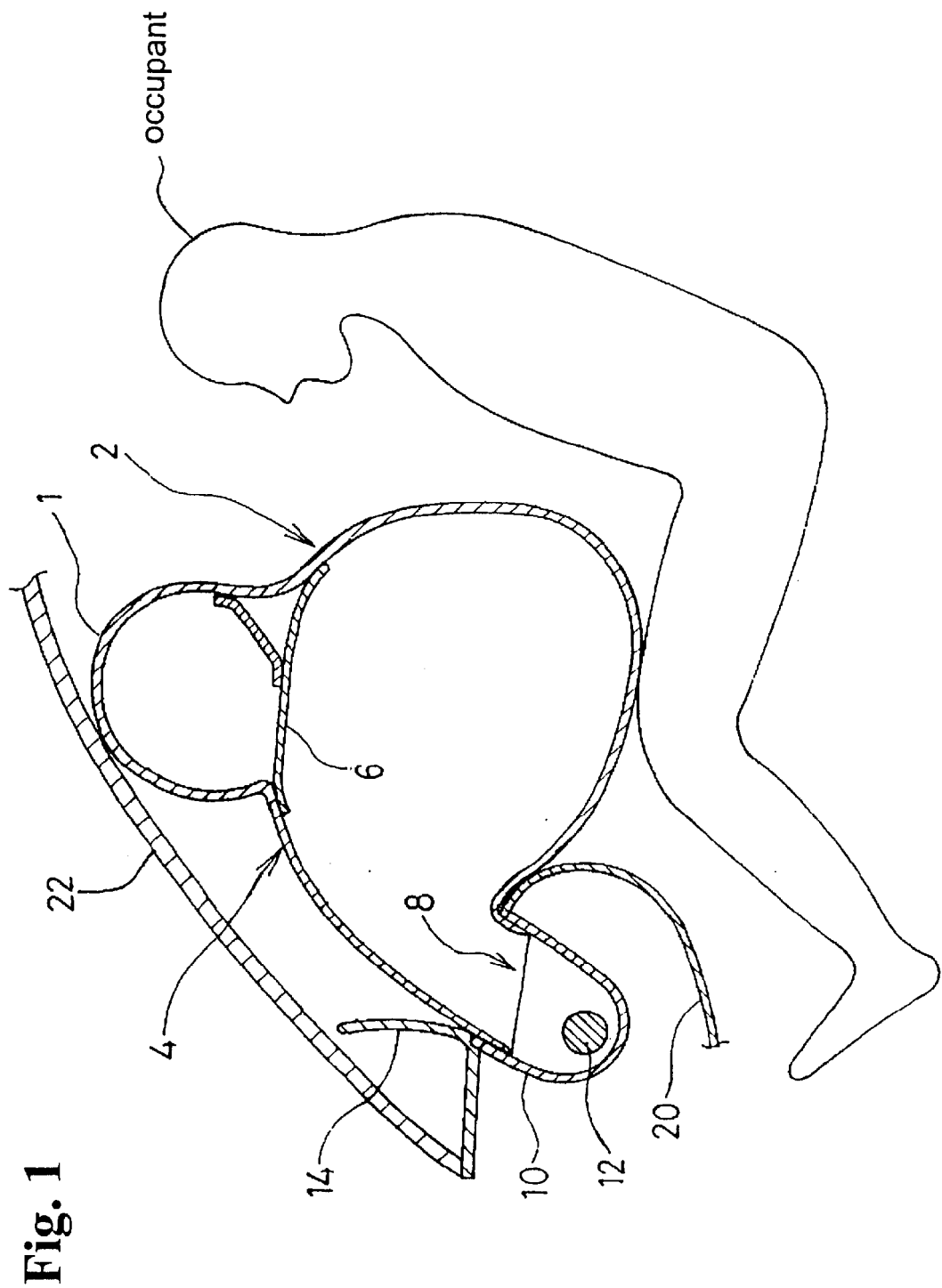
FIG. 1 is a sectional view of a passenger-seat airbag according to an embodiment of the present invention showing a state of the expansion completion of the airbag.
Figure 2:
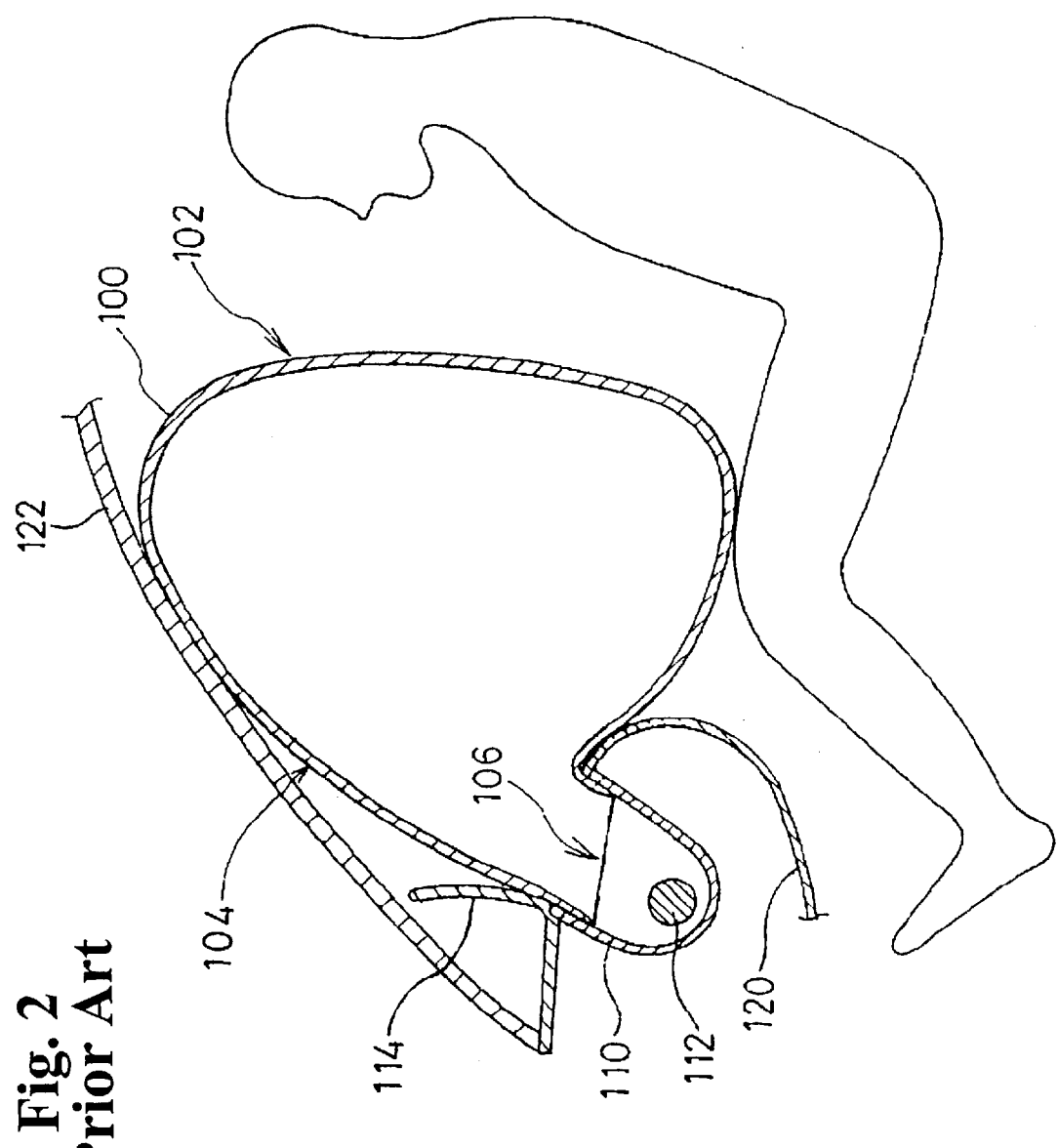
FIG. 2 is a sectional view of a conventional passenger-seat airbag showing a state of the expansion completion of the airbag.

An embodiment according to the present invention will be described below with reference to the drawings. FIG. 1 is a sectional view of a passenger-seat airbag according to the embodiment of the present invention showing a completely expanded state of the airbag.

A passenger-seat airbag 1 has a substantially conical expanded shape tapered toward the rear end (left end viewed in FIG. 1) thereof. The front end (right end viewed in FIG. 1) of the airbag 1 in the inflating direction opposes an occupant when the airbag 1 is inflated upon an emergency such as a vehicle collision so as to form an occupant-facing surface 2 having an area sufficient for receiving the occupant. The upper base-end (upper side viewed in FIG. 1) face of the airbag 1 forms a windshield-facing surface 4 opposing a windshield 22 in the front of a vehicle when the airbag 1 is inflated.

The occupant-facing surface 2 and the windshield-facing surface 4 are connected together with an internal member 6 so that intermediate portions of these surfaces in the vertical direction are not separated from each other more than a predetermined space.

One end of the internal member 6, which is made from cloth, resin sheet, or the like, is connected to the occupant-facing surface 2 and other end thereof to the windshield-facing surface 4 by connecting means such as stitching, adhesion, and welding, respectively.

In the airbag 1 in which the occupant-facing surface 2 and the windshield-facing surface 4 are connected together with the internal member 6, when an inflator 12 which will be described later is operated for injection of gas, the occupant-facing surface 2 is inflated toward the occupant due to the gas pressure from the inflator 12 while an intermediate portion of the windshield-facing surface 4 in the vertical direction, which is connected to the occupant-facing surface 2, is pulled by the occupant-facing surface 2 toward the occupant via the internal member 6. Upon the expansion completion of the airbag 1, the intermediate portion of the windshield-facing surface 4 is separated from the windshield 22 so that a part of the windshield-facing surface 4 sinks inside the airbag.

The internal member 6 connects the occupant-facing surface 2 and the windshield-facing surface 4 without breaking even in a final expanded shape. In addition, the internal member 6 is preferably cord-like or band-like so that upper and lower parts of the inside of the airbag 1 relative to the internal member 6 are usually communicated with each other. When the airbag 1 is inflated due to the gas from the inflator 12, the upper part relative to the internal member 6 is also inflated promptly.

The periphery of an opening 8 at the rear end of the airbag 1 is connected to the opening periphery in the front side of a container-like retainer 10. Within the retainer 10, the inflator 12 is equipped so that gas injected from the inflator 12 is introduced into the airbag 1 via the opening thereof. The airbag 1 is folded and accommodated into the retainer 10. A lid 14 is attached to the opening of the retainer 10, and in this state, the airbag 1 is equipped in an automobile instrument panel 20.

Upon an emergency such as a vehicle collision, the airbag 1 is inflated by the injected gas from the inflator 12 and expands into a vehicle cabin by pushing and opening the lid 14.

At this time, in the airbag 1, while the occupant-facing surface 2 is promptly inflated toward the occupant by the gas pressure from the inflator 12, an intermediate portion of the windshield-facing surface 4, which is connected to the occupant-facing surface 2 via the internal member 6, is pulled by the occupant-facing surface 2 toward the occupant, so that the airbag 1 expands finally in a shape such that a part of the windshield-facing surface 4 sinks inwardly.

Consequently, the volume of the airbag 1 is reduced by the inwardly depressed amount of the intermediate portion of the windshield-facing surface 4, so that the airbag 1 can rapidly complete the inflation sufficiently enough even when the output of the inflator 12 is relatively small. Also, a part of the upper windshield-facing surface 4, which does not oppose the occupant, is depressed inside the airbag so as to reduce the volume of the airbag, and the occupant-facing surface 2 approaches sufficiently close to the occupant upon completion of the expansion. Accordingly, the occupant is promptly received by the occupant-facing surface 2 of the airbag 1 in a vehicle collision, so that the movement distance of the occupant in a condition that the occupant is in contact with the occupant-facing surface 2 is increased.

In the airbag 1, upon completion of the expansion, the intermediate portion of the windshield-facing surface 4 becomes a concavely depressed state inside the airbag; however, the upper end thereof is largely inflated so as to contact the windshield 22, so that even when the occupant impacts and strongly urges the airbag 1, the upper end of the windshield-facing surface 4 abuts against the windshield 22 so as to securely support the airbag 1 for providing a sufficient reaction force to the airbag 1. Therefore, an impact applied to an occupant can be sufficiently absorbed by the airbag 1.

In addition, the internal member 6 is not limited to be band-like or cord-like member; however, it may be a panel having an opening or the like.

In the above-described embodiment, the internal member 6 does not break when the occupant hits the airbag. However, the internal member 6 may be broken or torn when the occupant hits or impacts the inflated airbag 1, to absorb the impact thereof.

Figure 3:
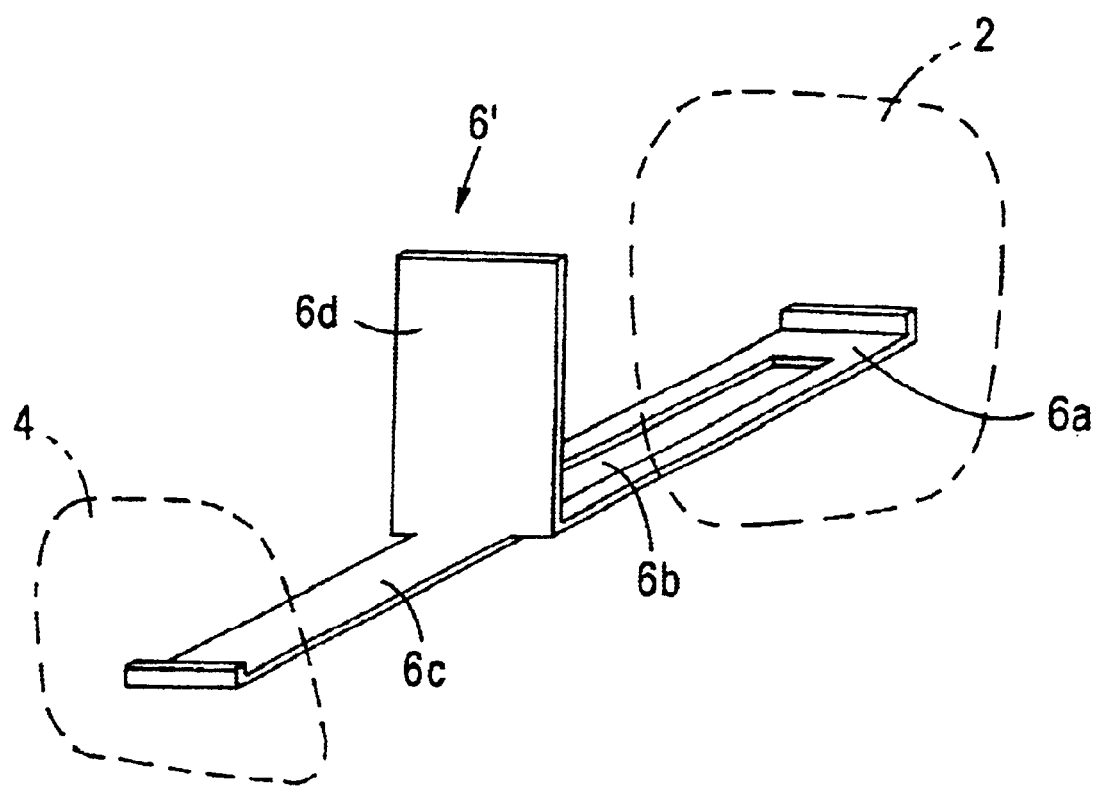
FIG. 3 is an explanatory perspective view of an internal member used in the invention.

FIG. 3 shows a perspective view of another embodiment of the internal member 6' of the invention to absorb the impact applied to the airbag. The internal member 6' is formed of a cloth having a first flap 6a with an opening 6b, a second flap 6c, and a third flap 6d. The internal member 6' is formed by cutting the opening 6b so that the first flap 6a and the second flap 6c are formed from a rectangular cloth. The first and second flaps 6a, 6c are fixed to the occupant-facing surface 2 and the windshield-facing surface 4 inside of the airbag as in the embodiment shown in FIG. 1 by sewing, adhering and the like. The cloth of the internal member 6' is made of a material such that the third flap 6d can be torn when the first and second flaps 6a, 6c are pulled in the opposite directions.

In FIG. 3, the internal member 6' is fully stretched when the airbag is completely inflated. In this condition, when the occupant impacts the airbag, the inner pressure of the airbag increases to thereby push the windshield-facing surface 4 outwardly. As a result, the third flap 6d is torn by the pulling pressure between the first and second flaps 6a, 6c. Accordingly, the impact applied to the airbag is absorbed by the internal member 6'. The internal member 6' may have a different shape and structure, such as one side of a rectangular cloth is simply cut into two pieces, and so on.

As described above, according to the passenger-seat airbag device of the present invention, the volume of the airbag can be reduced while sufficiently maintaining the impact-absorbing capacity of the airbag. Even when using a small capacity inflator, the expansion of the airbag is promptly completed while the occupant-facing surface expands in the wide range so as to securely protect an occupant.

While the invention has been explained with reference to the specific embodiments of the invention, the explanation is illustrative, and the invention is limited only by the appended claims.

What is claimed is:

1. A passenger-seat airbag device for a vehicle, comprising:

an instrument panel for the vehicle, a windshield extending upwardly from the instrument panel, and an airbag installed in an upper surface of the instrument panel to be inflated between the windshield and an occupant, said airbag including a first surface facing the windshield, a second surface facing the occupant, and an internal member situated in the airbag and connecting the first and second surfaces so that when the airbag is fully inflated, a top of the first surface contacts the windshield, a rest of the first surface is separated from the windshield, and a part of the first surface under the top is pulled toward the second surface by the internal member to thereby form a concave depression extending toward the second surface in the first surface, said internal member being made of a fabric member having two side portions, one of the two side portions being formed separately to form two flaps connected to the first and second surfaces and the other of the two side portions forming a middle portion between the two flaps, said fabric member forming the middle portion being gradually torn when the occupant hits the airbag.

2. A passenger-seat airbag device according to claim 1, wherein said internal member connecting the first surface and the second surface has sufficient strength so as not to break when the airbag is fully inflated.

3. A passenger-seat airbag device according to claim 2, wherein said internal member breaks when the occupant impacts the inflated airbag after the airbag is fully inflated.

4. A passenger-seat airbag device according to claim 3, wherein said internal member is gradually torn to absorb an impact applied to the airbag.

5. A passenger-seat airbag device according to claim 1, wherein said fabric member is cut at the one of the two side portions to form an opening therein to thereby form the two flaps.

* * * * *